United States Patent
Park et al.

(10) Patent No.: US 10,573,027 B2
(45) Date of Patent: Feb. 25, 2020

(54) DEVICE AND METHOD FOR DIGITAL PAINTING

(71) Applicant: ELECTRONICS AND TELECOMMUNICATIONS RESEARCH INSTITUTE, Daejeon (KR)

(72) Inventors: Seong Hee Park, Daejeon (KR); Tae-Gyu Kang, Daejeon (KR); Dae Ho Kim, Daejeon (KR); You Jin Kim, Daejeon (KR); Hyunseok Kim, Daejeon (KR); Jung Sik Sung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 20 days.

(21) Appl. No.: 15/938,091

(22) Filed: Mar. 28, 2018

(65) Prior Publication Data
US 2018/0286084 A1    Oct. 4, 2018

(30) Foreign Application Priority Data

Apr. 4, 2017 (KR) .................. 10-2017-0043776

(51) Int. Cl.
| | |
|---|---|
| *G09G 5/06* | (2006.01) |
| *G06T 11/00* | (2006.01) |
| *G06T 11/80* | (2006.01) |
| *G09G 3/30* | (2006.01) |
| *G09G 5/02* | (2006.01) |
| *G09G 3/20* | (2006.01) |

(52) U.S. Cl.
CPC ............ *G06T 11/001* (2013.01); *G06T 11/80* (2013.01); *G09G 3/2003* (2013.01); *G09G 3/30* (2013.01); *G09G 5/024* (2013.01); *G09G 5/06* (2013.01)

(58) Field of Classification Search
CPC ......... G06T 11/001; G06T 11/80; G09G 5/06; G09G 3/32; G09G 3/3208; G06F 3/03545; G06F 3/0412
See application file for complete search history.

(56) References Cited

U.S. PATENT DOCUMENTS

| | | | |
|---|---|---|---|
| 8,055,068 B2* | 11/2011 | Fuse .................. | G06F 3/03545 382/165 |
| 2006/0084039 A1* | 4/2006 | Ryokai .................... | B44D 3/00 434/155 |
| 2009/0146975 A1* | 6/2009 | Chang ................ | G06F 3/03545 345/179 |

(Continued)

FOREIGN PATENT DOCUMENTS

| | | |
|---|---|---|
| KR | 10-1362104 B1 | 2/2014 |
| KR | 10-2014-0029038 A | 3/2014 |
| KR | 10-2014-0029968 A | 3/2014 |

*Primary Examiner* — Antonio A Caschera
(74) *Attorney, Agent, or Firm* — LRK Patent Law Firm

(57) ABSTRACT

A digital painting device and method. The digital painting device includes a generator to generate a color generation signal corresponding to color data in an electronic palette selected by an electronic brush, and a displayer to transmit the color generation signal to a light-emitting module that touches the electronic brush in a time period in which the color generation signal is maintained such that the color data is displayed on the light-emitting module.

12 Claims, 12 Drawing Sheets

(56) References Cited

U.S. PATENT DOCUMENTS

| | | |
|---|---|---|
| 2013/0271433 A1 | 10/2013 | Kyung et al. |
| 2016/0034052 A1 | 2/2016 | Shu |
| 2016/0048221 A1* | 2/2016 | Boulanger ............ G06F 3/0321 345/594 |
| 2016/0334891 A1* | 11/2016 | Ozoemenam ....... G06F 3/03545 |

* cited by examiner

Digital painting device 200

DEVICE AND METHOD FOR DIGITAL PAINTING

CROSS-REFERENCE TO RELATED APPLICATION(S)

This application claims the priority benefit of Korean Patent Application No. 10-2017-0043776, filed Apr. 4, 2017, in the Korean Intellectual Property Office, the disclosure of which is incorporated herein by reference for all purposes.

BACKGROUND

1. Field

One or more example embodiments relate to a device and method for digital painting.

2. Description of Related Art

Amid the proliferation of mobile devices, many offline methods have become digitalized. For example, there is a method by which, when a user uses a pen-shaped tool in a mobile device as if the user writes a letter with an actual pen on a hand, the letter is expressed on an electronic device.

A user may draw or paint a picture on a canvas after placing colors on a palette and putting a desired color on a brush. This is a basic method that is used to draw or paint a picture, and people of all ages and both genders may paint a picture in such a way without an additional instruction, only if they have a palette, a brush, and a canvas.

However, there is still a lack of technology to digitalize such an actual method. Therefore, there is a desire for technology for digitally and intuitively painting a picture using a palette, a brush, and a canvas.

SUMMARY

An aspect provides a method of expressing or depicting a picture or a letter on an electronic canvas formed of a light-emitting module, by using an electronic brush and an electronic palette.

Another aspect also provides a method of allowing a user to intuitively express or depict a picture or a letter using an electronic brush, an electronic palette, and an electronic canvas, and thus providing the user with a user experience (UX) from which the user feels as if the user dips into a color on a palette and paints a picture on a canvas with a brush.

According to an aspect, there is provided a digital painting device including a generator configured to generate a color generation signal corresponding to color data in an electronic palette selected by an electronic brush, and a displayer configured to transmit the color generation signal to a light-emitting module being in contact with the electronic brush in a time period in which the color generation signal is maintained such that the color data is displayed on the light-emitting module.

According to another aspect, there is provided a digital painting method including generating a color generation signal corresponding to color data in an electronic palette selected by an electronic brush, and transmitting the color generation signal to a light-emitting module being in contact with the electronic brush in a time period in which the color generation signal is maintained such that the color data is displayed on the light-emitting module.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
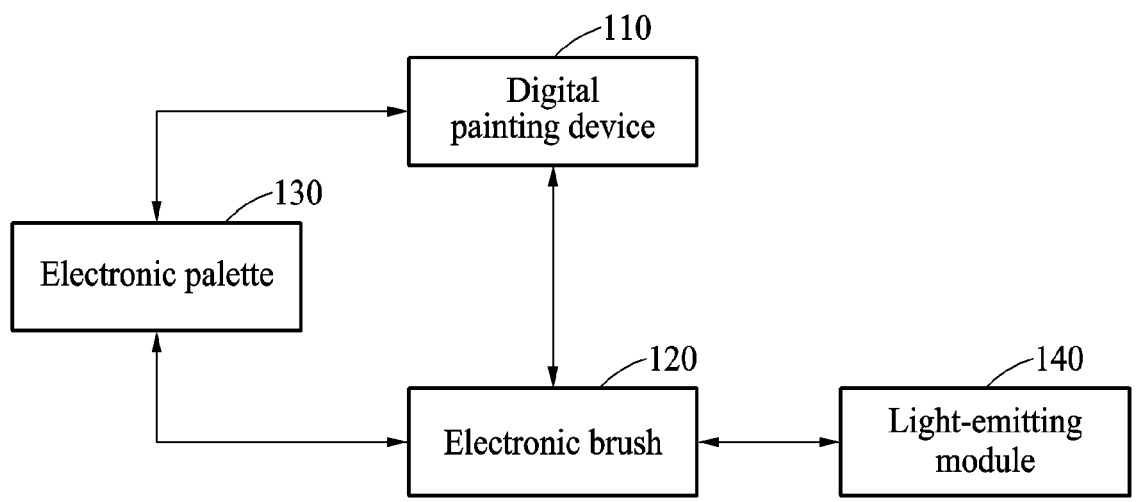
FIG. 1 is a diagram illustrating an example of a digital painting system according to an example embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

A device and method for digital painting, or simply referred to as a digital painting device and method, that is described herein may allow a user to select a desired color from an electronic palette and express a desired paint or letter on an electronic canvas formed of a light-emitting module using an electronic brush.

FIG. 1 is a diagram illustrating an example of a digital painting system according to an example embodiment.

Referring to FIG. 1, a digital painting system 100 includes a digital painting device 110, an electronic brush 120, an electronic palette 130, and a light-emitting module 140.

The digital painting device 110 may be connected to the electronic brush 120 through wireless communication, but not limited thereto. The digital painting device 110 may be included in the electronic brush 120. Herein, the wireless communication may be short-range wireless communication, such as, for example, Bluetooth, magnetic secure transmission (MST), beacon, near-field communication (NFC), and WiFi.

The digital painting device 110 may generate a color generation signal corresponding to color data. The color generation signal refers to a signal that allows a color corresponding to the color data to be displayed on the electronic palette 130 or the light-emitting module 140.

The digital painting device 110 may transmit the generated color generation signal to the light-emitting module 140 through the electronic brush 120 such that the color data is displayed on the light-emitting module 140. Herein, the digital painting device 110 may transmit the color generation signal to the light-emitting module 140 where the electronic brush 120 approaches or touches.

The digital painting device 110 may register the electronic palette 130 including a plurality of sets of color data. Herein, the digital painting device 110 may register the electronic palette 130 by transmitting the sets of color data through the electronic brush 120. The electronic palette 130 may be included in the light-emitting module 140, or included in a mobile device (not shown).

The light-emitting module 140 may be a light-emitting diode (LED), and a plurality of light-emitting modules may be arranged to be embodied in a form of an electronic canvas.

The digital painting device 110 will be described in greater detail with reference to FIG. 2.

Figure 2:
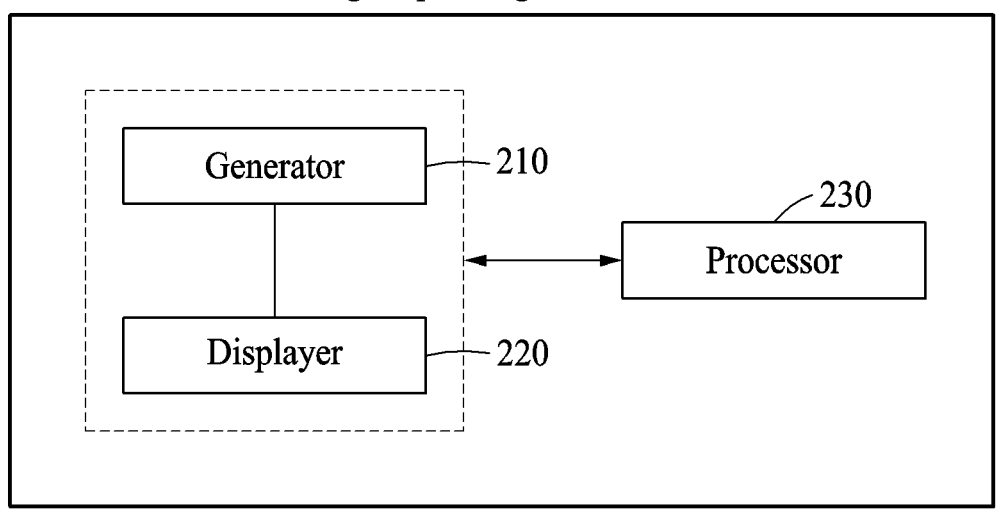
FIG. 2 is a diagram illustrating an example of a digital painting device according to an example embodiment.

FIG. 2 is a diagram illustrating an example of a digital painting device according to an example embodiment.

Referring to FIG. 2, a digital painting device 200 includes a generator 210 and a displayer 220. According to an example, the digital painting device 200 may further include a processor 230.

The generator 210 may generate a color generation signal corresponding to color data in an electronic palette selected by an electronic brush. That is, the generator 210 may generate a color generation signal for at least one color selected from a plurality of sets of color data included in the electronic palette. For example, when a red color is selected from the electronic palette including the red color, a yellow color, and a blue color, the generator 210 may generate a color generation signal indicating the selected red color.

In addition, the generator 210 may detect a motion through the electronic brush, and generate the color generation signal when the detected motion corresponds to a preset motion in a preset range. That is, the generator 210 may detect the motion occurring by a movement of the electronic brush through a motion sensor. When the motion corresponds to the preset motion, the generator 210 may determine that color data desired by a user is selected, and generate a corresponding color generation signal. For example, when the generator 210 detects a motion of the electronic brush shaking two times within a preset range after color data of a red color is selected by the electronic brush, the generator 210 may determine that the motion indicates generation of a corresponding color generation signal, and generate the color generation signal.

In addition, when a plurality of sets of color data is selected by the electronic brush during a time period, the generator 210 may generate mixed color data by mixing the selected sets of color data, and generate a mixed color generation signal corresponding to the mixed color data in place of the color generation signal. That is, when different sets of color data are selected in a time, the generator 210 may mix the selected sets of color data and generate a corresponding mixed color generation signal. For example, when color data selected within three seconds indicate a red color and a yellow color, the generator 210 may generate a mixed color generation signal indicating an orange color.

Further, when a plurality of sets of color data is selected by the electronic brush during the time period, the generator 210 may generate a plurality of color generation signals respectively corresponding to the selected sets of color data. That is, when a plurality of sets of color data is selected within a preset time, the generator 210 may generate a plurality of color generation signals respectively corresponding to the selected sets of color data. For example, when sets of color data are selected in a sequential order of a red color, a yellow color, and a blue color, in a preset time period, for example, three seconds, the generator 210 may generate corresponding color generation signals in the sequential order of the red color, the yellow color, and the blue color.

Herein, the displayer 220 may transmit the color generation signals in the sequential order each time the electronic brush touches a light-emitting module. That is, the displayer 220 may transmit the color generation signals to a plurality of light-emitting modules coming into contact with the electronic brush in a sequential order of the generated color generation signals, and allow corresponding color data to be displayed. For example, when the electronic brush sequentially touches a first light-emitting module, a second light-emitting module, and a third light-emitting module based on color generation signals generated in an order of a red color, a yellow color, and a blue color, the displayer 220 may transmit a color generation signal indicating the red color to the first light-emitting module, a color generation signal indicating the yellow color to the second light-emitting module, and a color generation signal indicating the blue color to the third light-emitting module.

The displayer 220 may transmit the color generation signal to the light-emitting module being in contact with the electronic brush in a time period in which the color generation signal is maintained such that the color data is displayed on the light-emitting module. That is, the displayer 220 may transmit the color generation signal to the light-emitting module that is touched by the electronic brush within a certain time period, and allow the light-emitting module receiving the color generation signal to display the color data. For example, when the color generation signal indicates a red color and the time period in which the color generation signal is maintained is three seconds, the displayer 220 may transmit the color generation signal indicating the red color to the light-emitting module that is to be touched in three seconds after the red color is selected by the electronic brush and the color generation signal indicating the red color is generated. Herein, the light-emitting module to which the displayer 220 transmits the color generation signal may be provided as a plurality of light-emitting modules. In the example described in the foregoing, the light-emitting module receiving the color generation signal may display the red color.

In addition, when the color data selected by the electronic brush and color data to be displayed on the light-emitting module differ from each other, the displayer 220 may cause the light-emitting module to blink one or more times. That is, when it is verified that the color generation signal generated through the electronic brush and a color generation signal to be transmitted to the light-emitting module differ from each other, the displayer 220 may allow the light-emitting module to blink one or more times such that a user may recognize such a verification. For example, when the color data selected by the electronic brush indicates a red color and the color data to be displayed on the light-emitting module indicates a yellow color, the displayer 220 may allow the light-emitting module to blink.

According to an example, when the color data selected by the electronic brush and the color data to be displayed on the light-emitting module differ from each other, the displayer 220 may allow a dominant set of color data among sets of color data indicated on neighboring light-emitting modules around the light-emitting module to be displayed, and allow the light-emitting module to blink one or more times. For example, when a red color is selected by the electronic brush and it is verified that a yellow color is displayed on a first light-emitting module among a plurality of light-emitting modules that is touched by the electronic brush, the displayer 220 may allow, to be displayed on the first light-emitting module, color data indicating the red color and displayed on light-emitting modules positioned on a left side, a right side, an upper side, and a lower side of the first light-emitting module, and allow the first light-emitting module to blink one or more times. For another example, when a red color is selected by the electronic brush and a yellow color is displayed on a first light-emitting module that is touched by the electronic brush, and light-emitting modules positioned on left, upper, and lower sides of the first light-emitting module display an orange color and a light-emitting module positioned on a right side of the first light-emitting module displays the red color, the displayer 220 may allow the first light-emitting to display the orange color, which is a more dominant color. In this example, when the number of colors displayed on the light-emitting modules positioned on the left, right, upper, and lower sides is all same, the displayer 220 may allow the first light-emitting module to display a color of priority based on a preset standard, for example, an order in which the colors are used, an order in which the colors are stored, a name order of the colors, and the like.

Herein, when the light-emitting module is touched by the electronic brush while the light-emitting module is blinking, the displayer 220 may retransmit the color generation signal to the light-emitting module, and allow the color data to be displayed on the light-emitting module. That is, the displayer 220 may retransmit a color generation signal to a light-emitting module retouched by the electronic brush, and allow color data desired by a user to be displayed. For example, when a light-emitting module displaying a yellow color blinks, the displayer 220 may transmit a color generation signal that indicates a red color and is generated through the electronic brush to the light-emitting module when the light-emitting module is retouched by the electronic brush, and stop the light-emitting module from blinking when the red color is displayed on the light-emitting module because the electronic brush and the light-emitting module indicate the same color data.

When the time period elapses, the processor 230 may output a phrase that expresses inquiry as to whether to store the color generation signal, and store the color generation signal along with the color data in a database based on a command input by a user reading the phrase. That is, when the color generation signal generated through the electronic brush is maintained for a preset time period, the processor 230 may output such an inquiry as to whether to store the color generation signal. Herein, when the user gives a command indicating "store," the processor 230 may store the color generation signal and the color data in the database. Herein, when the color generation signal generated through the electronic brush is a signal that is already stored in the database, the processor 230 may not output the phrase inquiring whether to store the color generation signal even though the time period elapses.

In addition, the processor 230 may receive a color from a user, and extract color data of the received color from the database and register the extracted color data in the electronic palette. Herein, when the number of extracted sets of color data is greater than the number of allowable sets of color data to be registered in the electronic palette, the processor 230 may register at least a portion of the extracted sets of color data in the electronic palette based on a frequency of use. For example, when the user inputs a red color, a yellow color, and a blue color, the processor 230 may register, in the electronic palette, color data indicating each of the red color, the yellow color, and the blue color. For example, when the user inputs six colors although the number of the allowable sets of color data to be registered in the electronic palette is five, the processor 230 may register, in the electronic palette, five sets of color data with a higher frequency of use. In addition, the processor 230 may receive an input requesting correction or modification of a configuration of the electronic palette from the user, and correct or modify the configuration of the electronic palette by, for example, removing or registering color data from or in the electronic palette in response to the received input requesting the correction or modification.

Thus, the digital painting device 200 may express a picture or a letter by allowing the picture or the letter to be displayed on an electronic canvas formed of a light-emitting module, using the electronic brush and the electronic palette described above.

In addition, the digital painting device 200 may allow a user to intuitively express a picture or a letter using the electronic brush, the electronic palette, and the electronic canvas, and thus may provide the user with a user experience (UX) from which the user may feel as if the user actually paints a picture on a canvas by dipping into a color on a palette with a brush.

In addition, the digital painting device 200 may mix desired colors among sets of color data included in the electronic palette, or display the colors on the electronic canvas in an order in which the colors are selected. Thus, the digital painting device 200 may enable an expression method different from a traditional one, thereby allowing a user to paint or draw a picture in a user's own way of expression using the different expression method.

Further, the digital painting device 200 may digitally paint a picture by allowing a user to paint a picture in a traditional way that the user paints a picture on a canvas using a brush and colors on a palette. Thus, the digital painting device 200 may enable all users including children and elderly users who may have difficulty in handling electronic devices to paint or draw pictures that they desire to express. Thus, it is expected that the digital painting device 200 may attract great attention and be used as hands-on learning play tools in exhibitions or educational fields.

Figure 3:
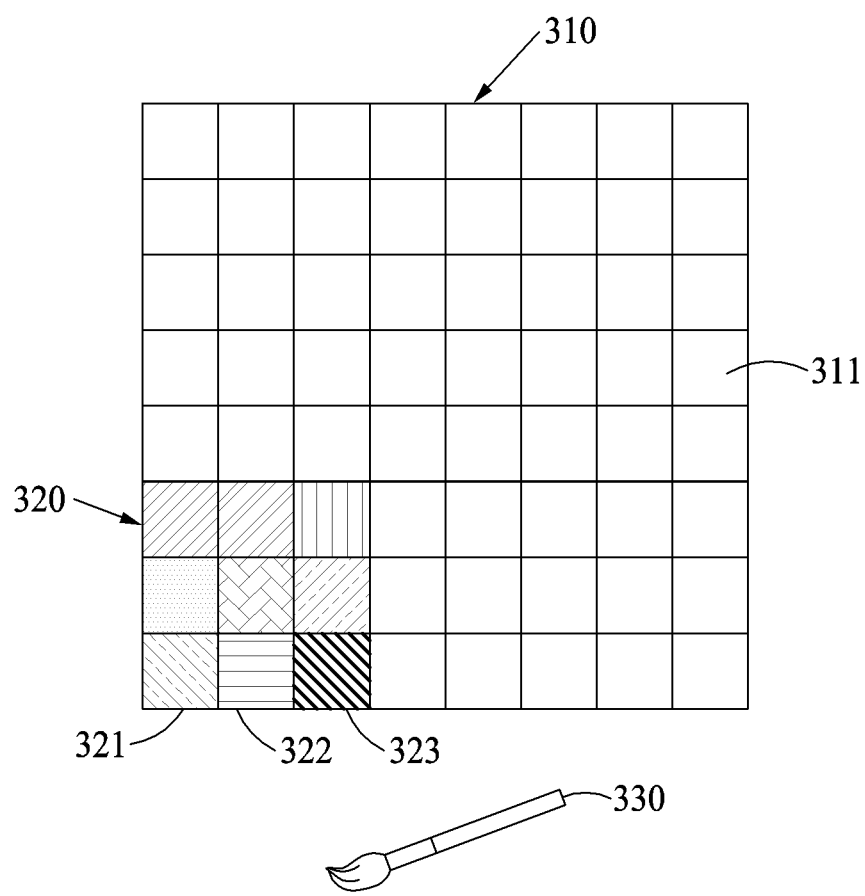
FIGS. 3 and 4 are diagrams illustrating examples of how a digital painting device paints a picture according to an example embodiment.
Figure 4:
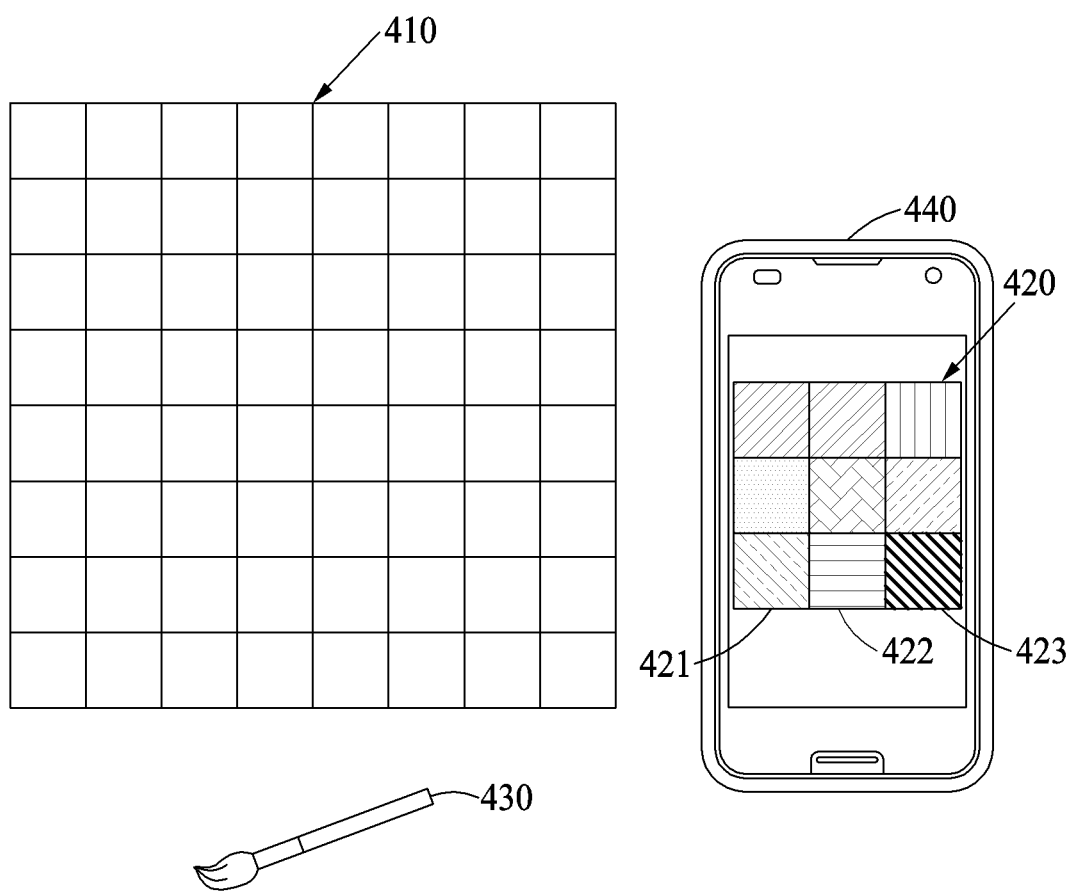

FIGS. 3 and 4 are diagrams illustrating examples of how a digital painting device paints a picture according to an example embodiment.

The digital painting device 200 may be included in an electronic brush 330 illustrated in FIG. 3 or an electronic brush 430 illustrated in FIG. 4, but not limited thereto. The digital painting device 200 may also be a device that is positioned outside the electronic brush 330 or 430 and communicates with the electronic brush 330 or 430.

Referring to FIG. 3, an electronic canvas 310 may be an illumination device including a plurality of light-emitting modules 311. For example, the electronic brush 330 may transmit a color generation signal to a light-emitting module that the electronic brush 330 touches or approaches among the light-emitting modules 311 in the electronic canvas 310 such that color data corresponding to the color generation signal to be displayed on the electronic canvas 310.

An electronic palette 320 may be positioned in the electronic canvas 310. For example, the electronic brush 330 may register a plurality of sets of color data 321, 322, and 323 in a portion of the electronic canvas 310 to configure the electronic palette 320. When at least one set of the sets of color data 321, 322, and 323 is selected from the electronic palette 320, the electronic brush 330 may generate a color generation signal corresponding to the selected color data.

For example, the digital painting device 200, or the electronic brush 330, may position the electronic palette 320 on the electronic canvas 310 including the light-emitting modules 311, select at least one set of the sets of color data 321, 322, and 323 from the electronic palette 30 including desired colors and generate a color generation signal corresponding to the selected color data, and then transmit the color generation signal to the light-emitting modules 311 in the electronic canvas 310. The light-emitting modules 311 may then illuminatingly display a color of the color data based on the color generation signal.

Referring to FIG. 4, an electronic palette 420 may be positioned outside an electronic canvas 410. The digital painting device 200, or the electronic brush 430, may register a plurality of sets of color data 421, 422, and 423 in a mobile device 440 that is positioned outside the electronic canvas 410, for example, a smartphone, a smart watch, a laptop, a wearable device, a tablet personal computer (PC), and the like, to configure the electronic palette 420. Although the electronic palette 420 is positioned outside the electronic canvas 410, the electronic brush 430 may also generate a color generation signal of color data selected from the sets of color data 421, 422, and 423 in the electronic palette 420.

For example, the electronic brush 430 may be connected to the mobile device 440 through wireless communication. The electronic brush 430 may also be connected to the electronic canvas 410 through wireless communication. The electronic brush 430 may select color data from the sets of color data 421, 422, and 423 in the electronic palette 420 registered in the mobile device 440, and then transmit a color generation signal of the color data selected from the electronic palette 420 to the electronic canvas 410 through the electronic brush 430. The electronic canvas 410 may then illuminatingly display a corresponding color selected from the mobile device 440.

FIGS. 5A through 5D, and 6A through 6E are diagrams illustrating examples of how a light-emitting module displays color data according to an example embodiment.

FIGS. 5A through 5D illustrate an example of how a light-emitting module displays color data when an electronic palette 510 is positioned in an LED illumination. In this example, the digital painting device 200 is described as being positioned outside an electronic brush 520. However, examples are not limited to the illustrated example.

Figure 5A:
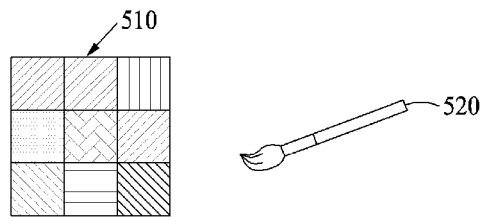
FIGS. 5A through 5D, and 6A through 6E are diagrams illustrating examples of how a light-emitting module displays color data according to an example embodiment.

Referring to FIG. 5A, when color data is selected from among sets of color data in the electronic palette 510 by the electronic brush 520, the digital painting device 200 may generate a color generation signal. The digital painting device 200 may generate the color generation signal in the electronic palette 510.

Figure 5B:
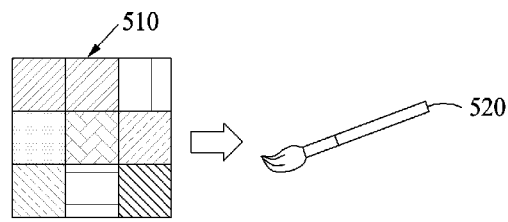

Referring to FIG. 5B, the digital painting device 200 may then transmit the color generation signal from the electronic palette 510 to the electronic brush 520.

Figure 5C:
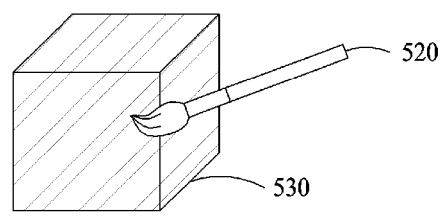

Referring to FIG. 5C, when the electronic brush 520 touches a light-emitting module 530, the digital painting device 200 may transmit the color generation signal to the light-emitting module 530 through the electronic brush 520.

Figure 5D:
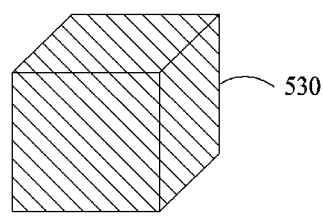

Referring to FIG. 5D, the light-emitting module 530 may display a color corresponding to the color data in response to the color generation signal.

FIGS. 6A through 6E illustrate an example of how a light-emitting module displays color data when an electronic palette is positioned in a mobile device 610. In this example, the digital painting device 200 is described as being positioned outside an electronic brush 620. However, examples are not limited to the illustrated example.

Figure 6A:
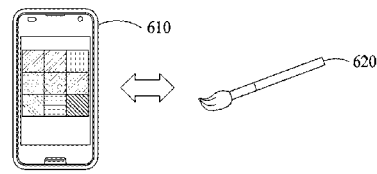

Referring to FIG. 6A, the digital painting device 200 may connect the mobile device 610 and the electronic brush 620 through wireless communication. For example, the digital painting device 200 may connect the mobile device 610 and the electronic brush 620 through short-range wireless communication, such as, for example, Bluetooth, MST, beacons, NFC, and WiFi.

Figure 6B:
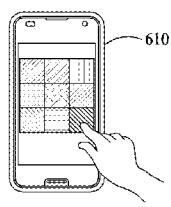

Referring to FIG. 6B, when a user selects one from among sets of color data in the mobile device 610, or the electronic palette, the digital painting device 200 may generate a color generation signal corresponding to the selected color data. The digital painting device 200 may generate the color generation signal in the mobile device 610.

Figure 6C:
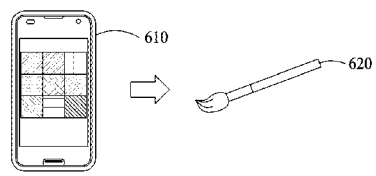

Referring to FIG. 6C, the digital painting device 200 may transmit the color generation signal from the mobile device 610 to the electronic brush 620.

Figure 6D:
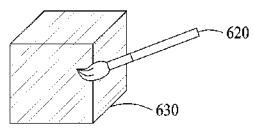

Referring to FIG. 6D, when the electronic brush 620 touches a light-emitting module 630, the digital painting device 200 may transmit the color generation signal to the light-emitting module 630 through the electronic brush 620.

Figure 6E:
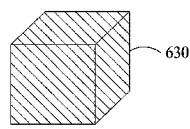

Referring to FIG. 6E, the light-emitting module 630 may display a color corresponding to the color data in response to the color generation signal.

Figure 7:
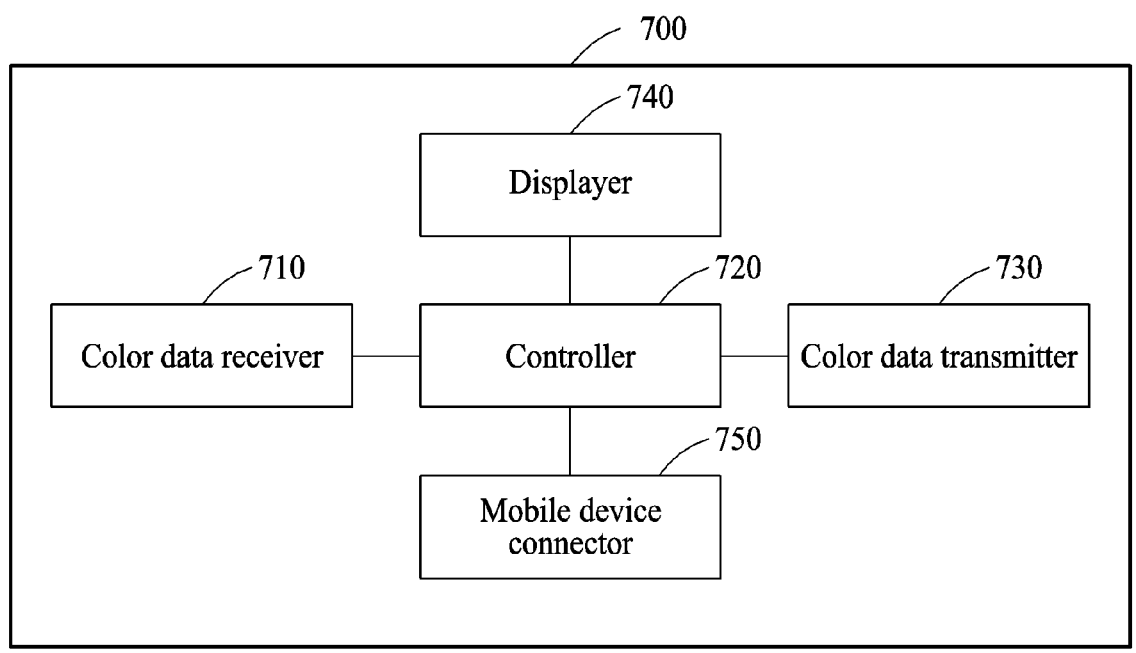
FIG. 7 is a diagram illustrating an example of an electronic brush of a digital painting system according to an example embodiment.

FIG. 7 is a diagram illustrating an example of an electronic brush of a digital painting system according to an example embodiment.

Referring to FIG. 7, an electronic brush 700 includes a color data receiver 710, a controller 720, a color data transmitter 730, and a displayer 740. According to an example, the electronic brush 700 may further include a mobile device connector 750.

The color data receiver 710 may be connected to an electronic palette through wireless communication, for example, infrared communication, radio-frequency identification (RFID), WiFi, Bluetooth, and the like, and thus receive color data from the electronic palette. In addition, the color data receiver 710 may transmit the received color data to the controller 720.

The controller 720 may transmit, to the color data transmitter 730, the color data received from the color data receiver 710.

The color data transmitter 730 may transmit the color data to an LED illumination through wireless communication.

The controller 720 may control the displayer 740 to display a connection state and color data such that a user verifies a state of the electronic brush 700.

The mobile device connector 750 may interconnect the electronic brush 700 and a mobile device, for example, a smartphone and a smart pad. The mobile device connector 750 may connect the electronic brush 700 and the mobile device by applying an existing wireless communication protocol, for example, Bluetooth and WiFi.

When the electronic brush 700 is connected to the mobile device, the color data receiver 710 may receive color data from the mobile device, and transmit the received color data to the controller 720.

The controller 720 may transmit, to the color data transmitter 730, the color data received from the color data receiver 710. The color data transmitter 730 may then transmit the color data to the LED illumination through wireless communication.

Figure 8:
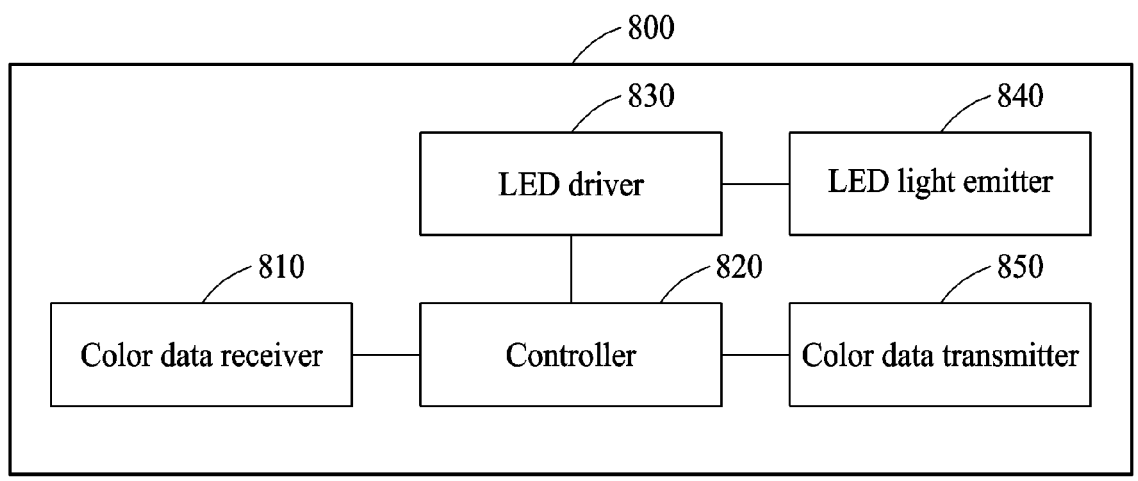
FIG. 8 is a diagram illustrating an example of an electronic palette of a digital painting system according to an example embodiment.

FIG. 8 is a diagram illustrating an example of an electronic palette of a digital painting system according to an example embodiment.

Referring to FIG. 8, an electronic palette 800 includes a color data receiver 810, a controller 820, an LED driver 830, an LED light emitter 840, and a color data transmitter 850.

The color data receiver 810 may receive color data from an electronic brush through wireless communication to provide a corresponding color to a user.

The controller 820 may store the received color data in a memory of the controller 820. In addition, the controller 820 may transmit the received color data to the LED driver 830.

The LED driver 830 may control the LED light emitter 840 to emit LED light corresponding to the color data.

The color data transmitter 850 may transmit, to the electronic brush, the stored color data through wireless communication with the electronic brush.

Figure 9:
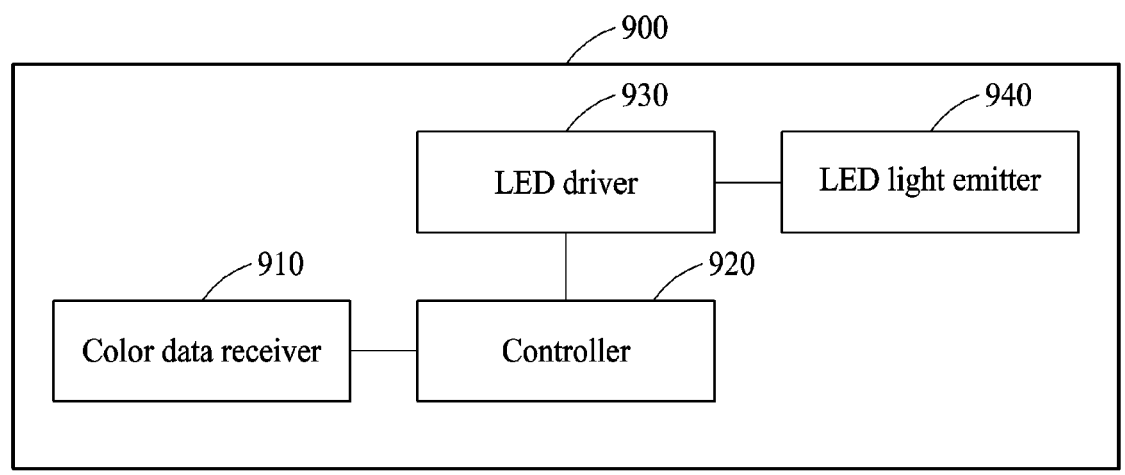
FIG. 9 is a diagram illustrating an example of a light-emitting module of a digital painting system according to an example embodiment.

FIG. 9 is a diagram illustrating an example of a light-emitting module of a digital painting system according to an example embodiment.

Referring to FIG. 9, a light-emitting module 900 includes a color data receiver 910, a controller 920, an LED driver 930, and an LED light emitter 940.

The color data receiver 910 may receive color data from an electronic brush through wireless communication, and then transmit the received color data to the controller 920.

The controller 920 may transmit, to the LED driver 930, the color data received from the color data receiver 910.

The LED driver 930 may control the LED light emitter 940 to emit LED light corresponding to the color data.

Figure 10:
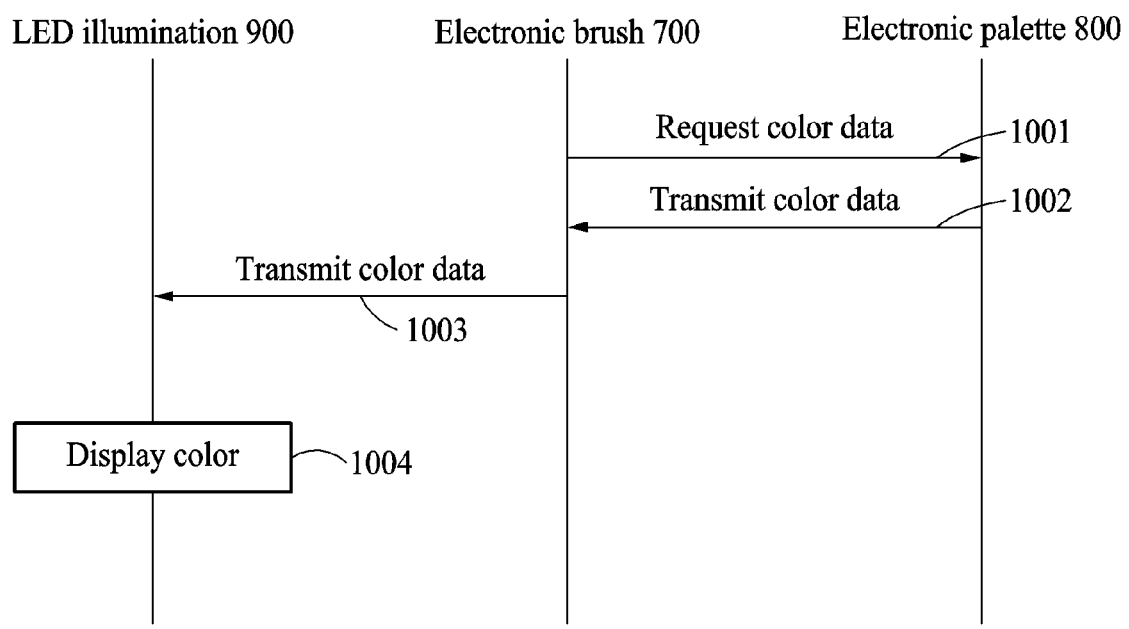
FIG. 10 is a diagram illustrating an example of how a color is displayed through a digital painting system according to an example embodiment.

FIG. 10 is a diagram illustrating an example of how a color is expressed through a digital painting system according to an example embodiment.

Referring to FIG. 10, a digital painting system includes the electronic brush 700, the electronic palette 800, and the light-emitting module 900, or an LED illumination 900 as illustrated in FIG. 10, which have been described above with reference to FIGS. 7, 8, and 9, respectively.

In operation 1001, the digital painting system requests color data of a desired color by allowing the electronic brush 700 to approach or touch the electronic palette 800 including the color. In operation 1002, the digital painting system transmits the color data from the electronic palette 800 to the electronic brush 700. In operation 1003, when a user approaches or touches the LED illumination 900 using the electronic brush 700, the digital painting system transmits the color data to the LED illumination 900. In operation 1004, the digital painting system allows the LED illumination 900 to display the color.

Figure 11:
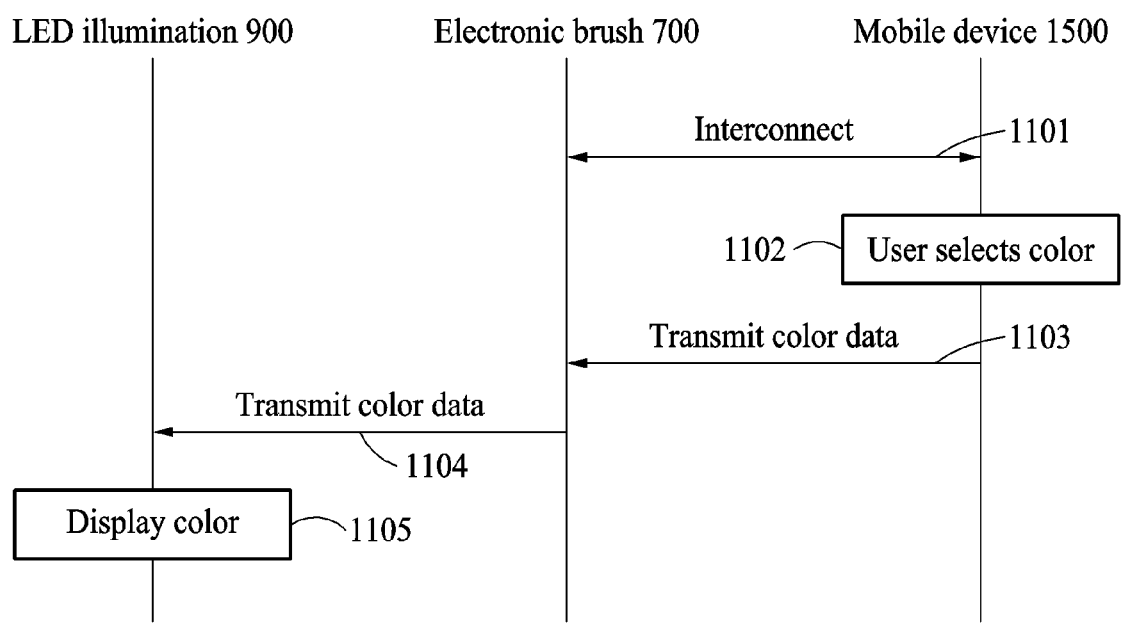
FIG. 11 is a diagram illustrating another example of how a color is displayed through a digital painting system according to an example embodiment.

FIG. 11 is a diagram illustrating another example of how a color is expressed through a digital painting system according to an example embodiment.

Referring to FIG. 11, a digital painting system includes the electronic brush 700 and the light-emitting module 900, or an LED illumination 900 as illustrated in FIG. 11, that have been described above with reference to FIGS. 7 and 8, respectively, and a mobile device 1500.

In operation 1101, the digital painting system interconnects the electronic brush 700 and the mobile device 1500 through wireless communication, for example, Bluetooth and WiFi. In operation 1102, a user selects a desired color from the mobile device 1500. In operation 1103, the digital painting system transmits color data of the color selected by the user from the mobile device 1500 to the electronic brush 700. In operation 1104, when the user approaches or touches the LED illumination 900 using the electronic brush 700, the digital painting system transmits the color data to the LED illumination 900. In operation 1105, the digital painting system allows the LED illumination 900 to display the color.

Figure 12:
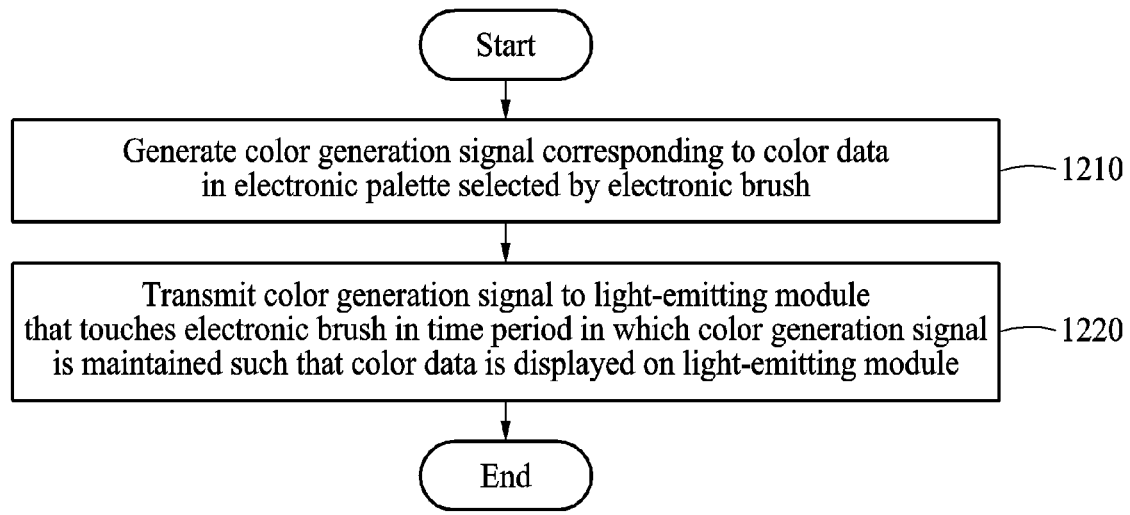
FIG. 12 is a flowchart illustrating an example of a digital painting method according to an example embodiment.

FIG. 12 is a flowchart illustrating an example of a digital painting method according to an example embodiment.

The digital painting method to be described hereinafter with reference to FIG. 12 may be performed by the digital painting device 200 described above.

Referring to FIG. 12, in operation 1210, the digital painting device 200 generates a color generation signal corresponding to color data included in an electronic palette and selected by an electronic brush. That is, the digital painting device 200 may generate a color generation signal corresponding to at least one color selected from a plurality of sets of color data included in the electronic palette. For example, when a red color is selected from the electronic palette including the red color, a yellow color, and a blue color, the generator 210 may generate a color generation signal indicating the selected red color.

In operation 1220, the digital painting device 200 transmits the color generation signal to a light-emitting module being in contact with the electronic brush in a time period in which the color generation signal is maintained such that the color data is displayed on the light-emitting module to. That is, the digital painting device 200 may transmit the color generation signal to the light-emitting module that touches the electronic brush within a certain period of time, and allow the light-emitting module receiving the color generation signal to display the color data. For example, when the color generation signal indicates a red color and the time period in which the color generation signal is maintained is three seconds, the digital painting device 200 may transmit the color generation signal indicating the red color to the light-emitting module that is to be touched within three seconds after the red color is selected by the electronic brush and the color generation signal indicating the red color is generated. In this example, the light-emitting module may be provided as a plurality of light-emitting modules, and the light-emitting module receiving the color generation signal among the light-emitting modules may display the red color.

According to an example, when a plurality of sets of color data is selected by the electronic brush during the time period, the digital painting device 200 may generate mixed color data by mixing the selected sets of color data, and generate a mixed color generation signal corresponding to the mixed color data in lieu of the color generation signal. That is, when a plurality of different sets of color data is selected in a certain period of time, the digital painting device 200 may generate a mixed color generation signal by mixing the selected sets of color data. For example, when sets of color data corresponding to a red color and a yellow color are selected in three seconds, the digital painting device 200 may generate a mixed color generation signal indicating an orange color.

According to an example, when a plurality of sets of color data is selected by the electronic brush during the time period, the digital painting device 200 may generate a plurality of color generation signals respectively corresponding to the selected sets of color data. That is, when a plurality of sets of color data is selected in a certain period of time, the digital painting device 200 may generate a color generation signal corresponding to each of the selected sets of color data. For example, when sets of color data are selected in an order of a red color, a yellow color, and a blue color in three seconds, which is a preset time period, the digital painting device 200 may generate corresponding color generation signals in an order of the red color, the yellow color, and the blue color.

Herein, the digital painting device 200 may sequentially transmit the generated color generation signals each time the electronic brush touches the light-emitting modules. That is, the digital painting device 200 may transmit the color generation signals in an order in which the color generation signals are generated to the light-emitting modules that the electronic brush touches. For example, when the electronic brush in which the color generation signals are generated in an order of a red color, a yellow color, and a blue color touches a first light-emitting module, a second light-emitting module, and a third light-emitting module in sequential order, the digital painting device 200 may transmit a color generation signal indicating the red color to the first light-emitting module, a color generation signal indicating the yellow color to the second light-emitting module, and a color generation signal indicating the blue color to the third light-emitting module.

According to an example, when the time period elapses, the digital painting device 200 may output a phrase that expresses an inquiry as to whether to store the color generation signal, and store the color generation signal along with the color data in a database based on a command input by a user reading the phrase. That is, the digital painting device 200 may output the phrase during a preset period of time in which the color generation signal generated in the electronic brush is maintained. For example, when the user gives a command indicating "store," the digital painting device 200 may store the color generation signal and the color data in the database. In this example, when the color generation signal generated in the electronic brush is a signal that is already stored in the database, the digital painting device 200 may not output such a phrase inquiring whether to store the color generation signal even though the time period elapses.

According to an example, when the color data selected by the electronic brush and color data to be displayed on the light-emitting module differ from each other, the digital painting device 200 may allow the light-emitting module to blink one or more times. That is, when it is verified that the color generation signal generated in the electronic brush and a color generation signal transmitted to the light-emitting module differ from each other, the digital painting device 200 may allow the user to recognize the difference by allowing the light-emitting module to blink one or more times. For example, when the color data selected by the electronic brush indicates a red color and the color data displayed on the light-emitting module indicates a yellow color, the digital painting device 200 may allow the light-emitting module to blink.

According to an example, when the color data selected by the electronic brush and the color data to be displayed on the light-emitting module differ from each other, the digital painting device 200 may allow the light-emitting module to display dominant color data among sets of color data displayed on neighboring light-emitting modules around the light-emitting module, and allow the light-emitting module to blink one or more times. For example, when a red color is selected by the electronic brush and a yellow color is displayed on a first light-emitting module among a plurality of light-emitting modules that is touched by the electronic brush, the digital painting device 200 may allow the first light-emitting module to display color data that corresponds to the red color and is displayed on neighboring light-emitting modules positioned on upper, lower, left, and right sides of the first light-emitting module, and allow the first light-emitting module to blink plural times. For another example, when a red color is selected by the electronic brush and a yellow color is displayed on a first light-emitting module that is to be touched by the electronic brush, and light-emitting modules positioned on the upper, lower, and left sides of the first light-emitting module display an orange color and a light-emitting module positioned on the right side of the first light-emitting module displays the red color, the digital painting device 200 may allow the first light-emitting module to display the orange color, which is the more dominant color. Also, in this example, when the numbers of colors of the light-emitting modules positioned on the upper, lower, left, and right sides are the same, the digital painting device 200 may allow a color of priority to be displayed based on a preset standard, for example, an order in which the colors are used, an order in which the colors are stored, and a name order of the colors.

According to an example, when a light-emitting module is touched by the electronic brush while the light-emitting module is blinking, the digital painting device 200 may retransmit a color generation signal to the light-emitting module such that the light-emitting module may display color data corresponding to the color generation signal. That is, the digital painting device 200 may retransmit a color generation signal to a light-emitting module that is retouched by the electronic brush such that color data desired by a user may be displayed. For example, when a light-emitting module displaying a yellow color is blinking and the electronic brush touches again the light-emitting module, the digital painting device 200 may retransmit a color generation signal generated by the electronic brush, for example, a color generation signal indicating a red color, to the light-emitting module. When the red color is displayed on the light-emitting module, the electronic brush and the light-emitting module may indicate the same color data, and thus the digital painting device 200 may stop the light-emitting module from blinking.

According to an example, the digital painting device 200 may receive, as an input, a color from a user, extract color data corresponding to the color from a database, and register the extracted color data in the electronic palette. Herein, when the number of extracted sets of color data is greater than the number of allowable sets of color data to be registered in the electronic palette, the digital painting device 200 may register at least a portion of the extracted sets of color data in the electronic palette based on a frequency of use. For example, when the user inputs colors, for example, a red color, a yellow color, and a blue color, the digital paining device 200 may register sets of color data respectively corresponding to the red color, the yellow color, and the blue color in the electronic palette. For example, when the user inputs six colors, although the number of the allowable sets of color data to be registered in the electronic palette is five, the digital painting device 200 may register, in the electronic palette, five sets of color data that have higher frequencies of use. In addition, the digital painting device 200 may receive, from a user, an input indicating correction or modification of a configuration of the electronic palette, and then correct or modify the configuration of the electronic palette by removing or registering, from or in the electronic palette, an individual set of color data corresponding to the input indicating the correction or modification.

According to an example, the digital painting device 200 may detect a motion through the electronic brush, and generate a corresponding color generation signal when the detected motion corresponds to a preset motion in a preset range. That is, the digital painting device 200 may detect the motion taken through a movement of the electronic brush using a sensor, and generate the color generation signal by determining that color data desired by the user is selected when the detected motion corresponds to the preset motion. For example, when color data of a red color is selected by the electronic brush and then a motion of the electronic brush shaking two times within a preset range is detected, the digital painting device 200 may determine that the motion indicates generation of a color generation signal, and generate the color generation signal.

As described above, the digital painting method may express a picture or a letter on an electronic canvas including a light-emitting module, using an electronic brush and an electronic palette.

In addition, the digital painting method may allow a user to intuitively express a picture or a letter using the electronic brush, the electronic palette, and the electronic canvas, and thus may provide the user with an UX from which the user may feel as if the user actually paints a picture on a canvas by dipping into a color on a palette with a brush.

In addition, the digital painting method may mix desired colors among sets of color data included in the electronic palette, or allow the colors to be displayed on the electronic canvas in an order in which the colors are selected, thereby enabling an expression method different from a traditional one and allowing a user to paint a picture in a user's own way of expression using the different expression method.

Further, the digital painting method may digitally paint a picture by allowing a user to paint the picture in a traditionally way that the user paints or draws the picture on a canvas using a brush and colors. Thus, the digital painting method may enable all users including children and elderly users who may have difficulty in handling electronic devices to paint or draw pictures that they desire to express. Thus, it is expected that the digital painting method may attract great attention and be used as hands-on learning play tools in exhibitions or educational fields.

According to example embodiments described herein, by allowing a user to express or depict a picture or a letter on an electronic canvas formed of a light-emitting module using an electronic brush and an electronic palette, the user may express the picture or the letter on the electronic canvas.

According to example embodiments described herein, by allowing a user to intuitively express or depict a picture or a letter using an electronic brush, an electronic palette, and an electronic canvas, the user may have an UX from which the user may feel as if the user paints a picture on a canvas by dipping into a color on a palette with a brush.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A digital painting device comprising:
    a generator configured to generate a color generation signal corresponding to color data in an electronic palette selected by an electronic brush;
    a displayer configured to transmit the color generation signal to a light-emitting module being in contact with the electronic brush in a time period in which the color generation signal is maintained such that the color data is displayed on the light-emitting module, and
    a processor configured to:
        receive, as an input, a color from a user; and
        extract color data of the color from a database and register the extracted color data in the electronic palette,
    wherein, when a number of extracted sets of color data is greater than a number of allowable sets of color data to be registered in the electronic palette, the processor is configured to register, in the electronic palette, at least a portion of the extracted sets of color data based on a frequency of use.

2. The digital painting device of claim 1, wherein, when a plurality of sets of color data is selected by the electronic brush during the time period, the generator is configured to:
    generate mixed color data by mixing the selected sets of color data; and
    generate a mixed color generation signal corresponding to the mixed color data, in place of the color generation signal.

3. The digital painting device of claim 1, wherein, when a plurality of sets of color data is selected by the electronic brush during the time period, the generator is configured to generate a plurality of color generation signals respectively corresponding to the selected sets of color data, and
    the displayer is configured to sequentially transmit the generated color generation signals each time the electronic brush touches the light-emitting module.

4. The digital painting device of claim 1, wherein, when the color data selected by the electronic brush and the color data displayed on the light-emitting module differ from each other, the displayer is configured to allow the light-emitting module to blink one or more times.

5. The digital painting device of claim 4, wherein, when the electronic brush touches the light-emitting module while the light-emitting module is blinking, the displayer is configured to retransmit the color generation signal to the light-emitting module such that the color data is displayed on the light-emitting module.

6. The digital painting device of claim 1, wherein, when a motion detected through the electronic brush corresponds to a preset motion in a preset range, the generator is configured to generate the color generation signal.

7. A digital painting method comprising:
    generating a color generation signal corresponding to color data in an electronic palette selected by an electronic brush;
    transmitting the color generation signal to a light-emitting module being in contact with the electronic brush in a time period in which the color generation signal is maintained such that the color data is displayed on the light-emitting module,
    receiving, as an input, a color from a user; and
    extracting color data of the color from a database and registering the extracted color data in the electronic palette,
    wherein, when a number of extracted sets of color data is greater than a number of allowable sets of color data to be registered in the electronic palette, the extracting of the color data and the registering of the color data comprises:
    registering, in the electronic palette, at least a portion of the extracted sets of color data based on a frequency of use.

8. The digital painting method of claim 7, further comprising:
when a plurality of sets of color data is selected by the electronic brush during the time period,
generating mixed color data by mixing the selected sets of color data; and
generating a mixed color generation signal corresponding to the mixed color data, in place of the color generation signal.

9. The digital painting method of claim 7, further comprising:
when a plurality of sets of color data is selected by the electronic brush during the time period,
generating a plurality of color generation signals respectively corresponding to the selected sets of color data; and
sequentially transmitting the generated color generation signals each time the electronic brush touches the light-emitting module.

10. The digital painting method of claim 7, further comprising:
when the color data selected by the electronic brush and the color data displayed on the light-emitting module differ from each other,
allowing the light-emitting module to blink one or more times.

11. The digital painting method of claim 10, further comprising:
when the electronic brush touches the light-emitting module while the light-emitting module is blinking,
retransmitting the color generation signal to the light-emitting module such that the color data is displayed on the light-emitting module.

12. The digital painting method of claim 7, further comprising:
detecting a motion through the electronic brush; and
generating the color generation signal when the detected motion corresponds to a preset motion in a preset range.

* * * * *